Nov. 25, 1958  W. K. SCHMID  2,862,166
VARIABLE SPEED INDUCTION MOTOR
Filed June 2, 1954  3 Sheets-Sheet 1
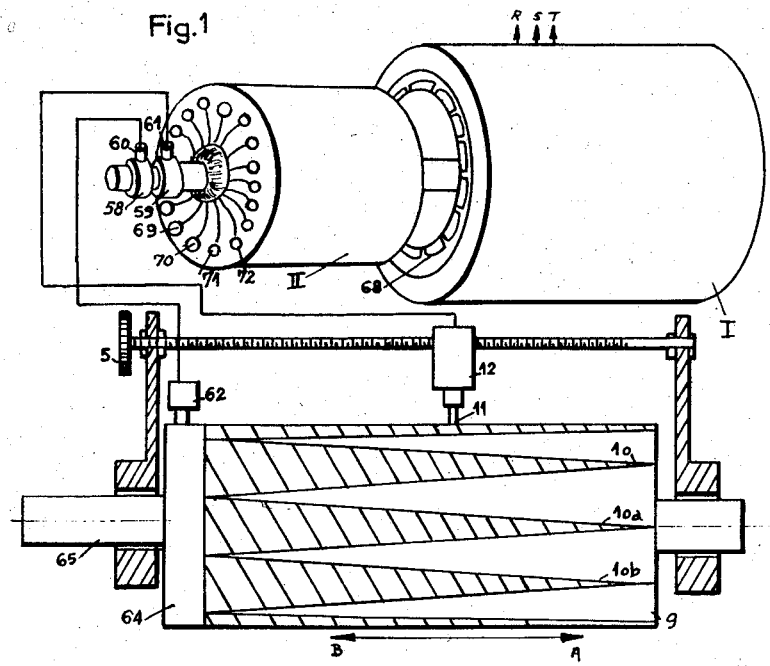
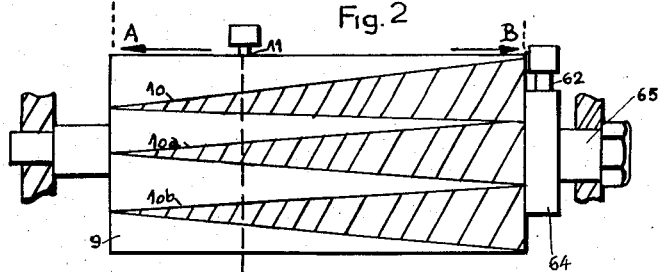
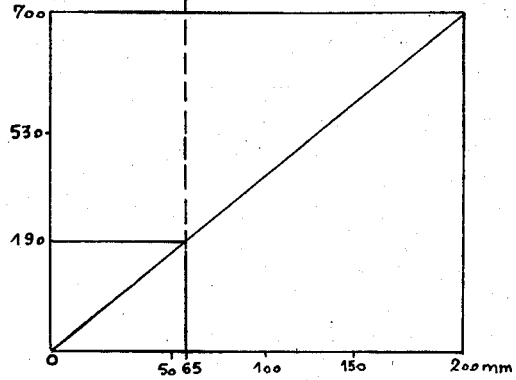
Inventor: Wolfgang Karl Schmid
By Eric D. Wankel
Patent Agent Nov. 25, 1958 W. K. SCHMID 2,862,166
VARIABLE SPEED INDUCTION MOTOR
Filed June 2, 1954 3 Sheets-Sheet 2
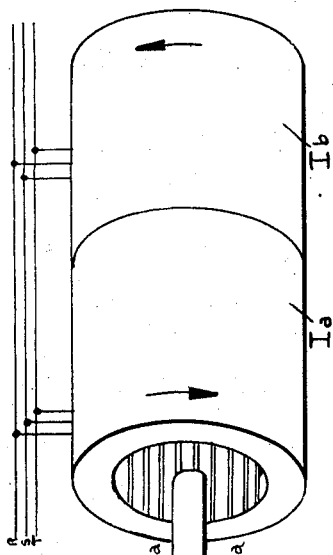
Fig. 3
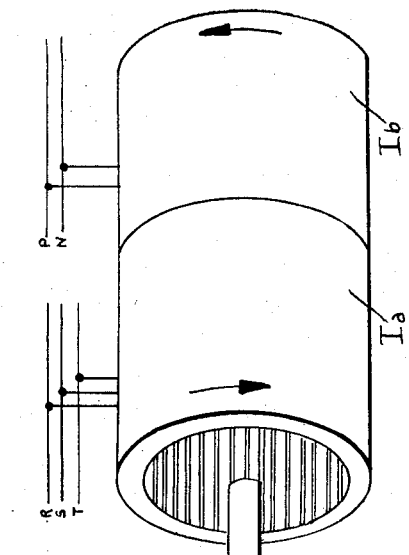
Fig. 4
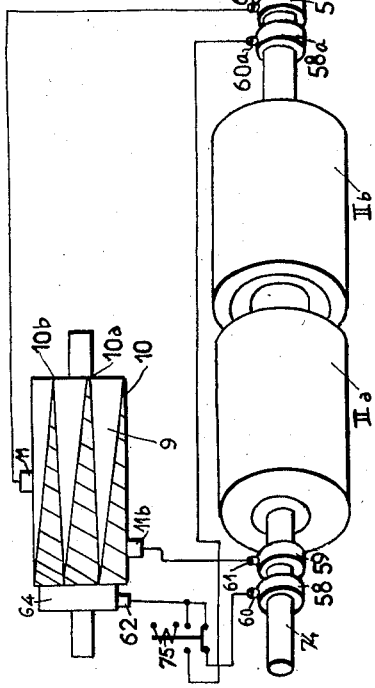
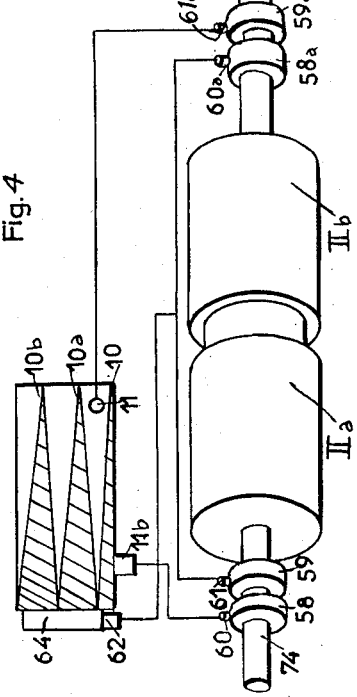
Inventor:
Wolfgang Karl Schmid
By [signature]
Patent Agent Nov. 25, 1958   W. K. SCHMID   2,862,166
VARIABLE SPEED INDUCTION MOTOR
Filed June 2, 1954   3 Sheets—Sheet 3

Inventor: Wolfgang Karl Schmid
By Eric D. Frankel
   Patent Agent

United States Patent Office 2,862,166
Patented Nov. 25, 1958

2,862,166

VARIABLE SPEED INDUCTION MOTOR

Wolfgang Karl Schmid, Gagny, France

Application June 2, 1954, Serial No. 434,028

11 Claims. (Cl. 318—232)

The present invention relates to an electromagnetic control drive mechanism and more specifically to an electric motor of the induction type, the speed of which can be controlled and adjusted in a simple manner.

United States patent application, Serial No. 326,395, filed December 17, 1952, relates to an electromagnetically controlled driving mechanism, in which magnetic fields are controlled with the aid of a pulse transmitter operable at variable pulse frequencies to influence the number of revolutions of the driving mechanism. In said device, the coil of an electromagnet of a clutch is energized by means of a suitably designed pulse transmitter, whereby the friction plate of this clutch is interruptedly attracted by said electromagnet and pressed on the cooperating clutch plate at intervals of controllable length or frequency.

The object of the invention of United States patent application, Serial No. 410,694, filed February 16, 1954, is a development or improvement of the aforementioned mechanism. According to the latter invention, a three-phase control motor is provided rather than a clutch, said motor having a stator adapted to be connected to a three-phase current network and producing a field rotating at a constant velocity, the rotor or armature of this motor, which is interruptedly energized by direct current pulses, being taken along by the rotating field of the stator, whereby the speed of the rotor can be controlled by the length and/or frequency of these direct current pulses.

The present invention is a further development of these systems. According to this improvement, a periodic current interrupter is used to interruptedly short-circuit the rotor or armature winding which is not supplied with current from an auxiliary or separate direct current source.

Furthermore and in accordance with another object or modification of the present invention, two stators may be structurally combined as a unit or built into a common housing in which a double armature or rotor is rotatably mounted. Each of these stators has its own winding adapted to be connected to a three-phase alternating current source in such a manner that the field of the one stator rotates in a direction opposite to the field of the other stator. Such a system does not require a reversing switch for changing the direction of the rotating field, i. e., the rotor or armature rotates in the one or the other direction, depending upon the short-circuiting of the one or the other of the rotor windings by the periodic current interrupter.

According to a further development or object of this invention, one of these stators may be energized by direct current to brake the rotor when the winding of the corresponding rotor is short-circuited.

With the foregoing and other objects in view, as will appear as this description proceeds, the present invention includes the following novel features, details of construction, combinations and circuit arrangements of cooperating elements, to be hereinafter more specifically set forth, claimed and illustrated in the accompanying drawings, forming part of this application, in which:

Figure 1 is a simple embodiment of the electromagnetic control drive mechanism, according to the invention comprising a motor having a stator with a winding fed by a three-phase alternating current and an armature or rotor of laminated sheets with a winding to be interruptedly short-circuited by means of a periodic current interrupter, i. e., a control cylinder, said motor being shown perspectively and said control cylinder being illustrated in side view and partly in section.

Figure 2 is a diagram showing a curve of the number of revolutions of the rotor, said curve being obtained when the adjustable member of said control cylinder, i. e., a contact brush, is displaced on or along said control cylinder, the latter being illustrated in side view.

Figure 3 is a circuit diagram of another embodiment of the new electromagnetic control drive comprising a motor having two stators, the fields of which rotate in opposite directions and which are built into a common housing, two rotors or armatures mounted on a common shaft being arranged to rotate in said combined stators. The motor in this figure is perspectively illustrated in an exploded view.

Figure 4 illustrates a circuit diagram of a further embodiment of the electromagnetic control drive comprising a motor having two combined stators, the winding of one of these stators being supplied with three-phase alternating current, while the winding of the other stator is fed by direct current, whereby the periodic current interrupter is provided with a special brush connected to the armature or rotor of this motor to cause braking pulses therein. The motor in this figure is perspectively illustrated in an exploded view.

Figure 6:
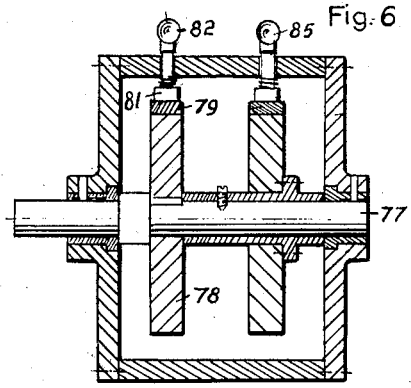
Figure 5:
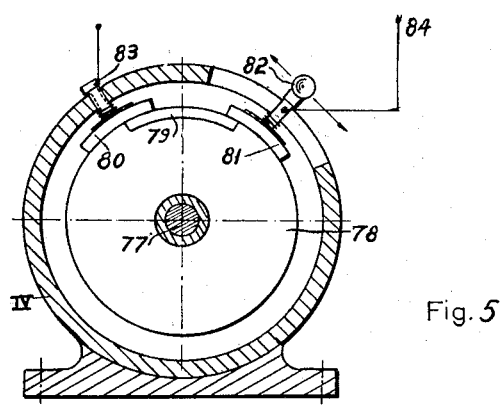
Figure 7:
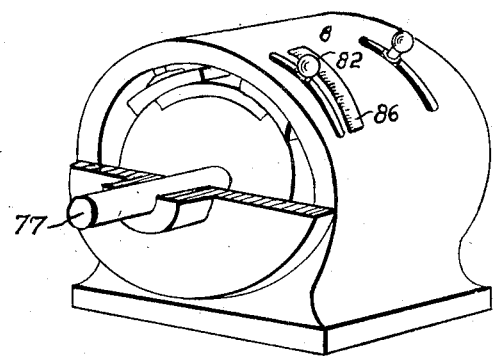

Figures 5 and 6 are longitudinal and cross sections, respectively, through modifications of pulse transmitters according to the invention, the latter pulse transmitter being shown in perspective view in Figure 7.

The electromagnetic control drive mechanism shown in Figure 1 comprises a three-phase alternating current, laminated stator I, the sheets 68 of which are slotted and equipped with a three-phase winding connectable to the terminals R, S, T, of a three-phase alternating current network. The armature or rotor II of this control drive mechanism constitutes a cylindrical package of round dynamo sheets. The individual sheets of this package are mounted on an insulating bushing made, for example, of plastic material, such as "Bakelite," and are insulated from one another, for example, by intermediate paper or other layers or coatings to avoid eddy currents. The sheets close to their periphery are provided with slots or holes 69, 70, 71, 72, in which armature coils are placed. The ends of these coils are connected to two slip rings 58 and 59 mounted on the armature shaft, stationary brushes 60 and 61, respectively, riding on said slip rings. A control cylinder 9, constituting the essential part of a periodic current interrupter, is mounted on a shaft 65 rotated at a substantially constant speed by a power means, not shown in the drawing. The brushes 60 and 61 are interruptedly short-circuited via the control cylinder 9 when the latter is rotated due to the provision of a connection between the brush 61 and a brush 11 riding on the control cylinder 9 and a connection between the brush 60 and a brush 62 riding on a slip ring 64 at the left side of the control cylinder 9. This control cylinder is made of insulating material and supports wedge-shaped or tapering electrically conductive segment members 10, 10a and 10b which are distributed over its circumference. These segment members 10, 10a and 10b are connected to the slip ring 64 of the control cylinder 9. When the armature coils are short-circuited via the control cylinder 9, a magnetic field is produced in the armature II, said field being taken along by the rotating field of the stator I. Preferably, several coils are provided in the armature in order to be able to adapt the current intensity of the armature to the permissible current density of the brushes. If the brush 11 is displaced on the control cylinder 9 in the direction A, the current pulses produced during the rotation of this control cylinder 9 become gradually shorter, while the current interruptions become longer, because the wedge-shaped metal segments 10, 10a and 10b are shown as tapering in the direction A. If the brush 11 is moved in the direction B, the short-circuiting pulses become gradually longer, because the brush 11 will then ride on the wider portions of the wedge-shaped segments 10, 10a and 10b.

Figure 2 is the curve of the number of revolutions obtained when the brush 11 of the periodic current interrupter is displaced on and along the control cylinder 9, the latter being shown above the diagram. If this brush 11 is in the outermost left position A, the armature winding is interrupted with the result that the armature II is standing still. If the brush 11 is now shifted a small distance in the direction B, the brush will contact the outer ends of the wedge-shaped segments 10, 10a and 10b during the rotation of the control cylinder, so that the armature winding will be short-circuited for rather short instances. The short-circuiting time periods will be increased, the farther the brush 11 is displaced in the direction B, whereby the velocity of the armature is gradually increased. The maximum speed will be obtained when the brush 11 is brought to the outermost right position B, whereby the armature rotates almost at the velocity of the rotating magnetic field of the stator I, because the winding of the armature II is then constantly short-circuited.

Figure 3 illustrates an electromagnetic control drive with two stators Ia and Ib for three-phase alternating current, the fields of said stators rotating in opposite with respect to one another. These stators are mounted in a common housing in which two armatures IIa and IIb rotate, said armatures being mounted on a common shaft 74. The field of the stator Ia rotates in clockwise direction, while the field of stator Ib rotates in counter-clockwise direction. The two stator windings designed as three-phase windings are connected to the conductors R, S, T of a three-phase network. During operation, the two stators remain constantly connected to the network. The armatures IIa and IIb comprise laminated sheet metal packages which are mounted on insulating bushings, for example, of Bakelite, to avoid eddy currents. The ends of the winding of the armature IIa are respectively connected to slip rings 58 and 59, while the ends of the windings of the armature IIb are respectively connected to slip rings 58a and 59a. If the slip rings 58 and 59 are interconnected, the armature shaft 74 will rotate in clockwise direction, while a connection of the slip rings 58a and 59a to one another results in a rotation of the shaft 74 in counter-clockwise direction. A brush 61 rides on the slip ring 59, said brush being connected to a brush 11b riding on the control cylinder 9. The brush 62 riding on the slip ring 64 is electrically connected to the segment members 10, 10a and 10b. If the brush 11b contacts one of the segment members 10, 10a or 10b, current will flow via the brush 62 to the brush 60 in the event that a change-over relay 75 is not energized, i. e., is in the position shown in Figure 3, whereby the winding of the armature IIa is short-circuited. If the changeover relay 75 is energized by a control pulse, the pair of rest contacts of this relay, which are shown closed in Figure 3, are opened. Simultaneously, a pair of working contacts of the same relay, which are shown in open position in Figure 4, are closed, whereby the brush 62 will be connected to the brush 60a riding on the slip rings 58a. In this position of the change-over relay 75, the winding of the armature IIb will be short-circuited when the brush 11 contacts one of the segment members 10, 10a or 10b, because this brush 11 is connected to the brush 61a riding on the slip ring 59a. Due to the provision of the two brushes 11 and 11b, which are independently adjustable on and along the control cylinder 9, the number of revolutions for clockwise operation can be independently set or controlled from that for counter-clockwise operation. In place of four slip rings, shown in Figure 3, the two armatures IIa and IIb may be equipped with three slip rings only, whereby one end of each of the windings of these armatures IIa and IIb is connected to a common slip ring.

The electromagnetic control drive according to the embodiment of Figure 4 has two stators, the winding of said stators, i. e., stator Ia, being connected to the conductors R, S, T of a three-phase alternating current source, while the winding of the other stator, i. e., stator Ib is supplied with direct current via the conductors P, N from a direct current source. Figure 4 shows furthermore a periodic current interrupter of similar construction as that in Figure 3. A special or second brush 11 riding on the control cylinder is used to cause an interrupted braking action of the armature, as will be explained below. If the winding of the armature IIa is short-circuited by means of the periodic current interrupter, the armature shaft 74 is rotated in the direction of the rotating field of the stator Ia, for example, in clockwise direction. If the winding of the armature IIb is short-circuited via the periodic current interrupter, the armature shaft 74 is braked by the direct current field in the stator Ib, as said field is standing still. The winding of the armature IIa is short-circuited via the brush 11b when this brush contacts any of the segment members 10, 10a or 10b. The brush 61a riding on the slip ring 59a is connected to the special brush 11 which is arranged with respect to the brush 11b in such a manner, that the latter will not contact any of the segment members 10, 10a or 10b when the special brush 11 is engaging them and vice versa. Consequently, the windings of the two armatures ar alternately short-circuited, as can be readily recognized from Figure 4 of the drawings. If the stator Ib would be connected to a three-phase alternating current network, rather than to a direct current source, braking pulses will likewise be obtained in case the field in the stator Ib is rotating in a direction opposite to that in the stator Ia. Thus, the present invention permits a number of modifications in the stator and armature combination and circuit diagram.

Figure 5 shows a modified construction of the periodic current interrupter. An insulating disk 78 made, for example, of Bakelite, is secured to or keyed on a shaft 77 of this periodic current interrupter, said disk 78 carrying on its circumference or periphery a metal segment 79. During the operation of the control drive, the periodic current interrupter shaft 77, which is rotatably mounted on a housing IV, is rotated at a substantially constant velocity by means not shown in the drawing. Two spring-pressed contact brushes 80 and 81 are resiliently engaging or riding on the periphery of the disk 78 and the metal segment 79. While the brush 80 is mounted in the housing IV of the periodic current interrupter at a relatively fixed position, the brush 81 can be angularly displaced in this housing with respect to the fixed brush 80 by means of a lever 82, i. e., the distance between the brushes 80 and 81 can be adjusted. The one end of the armature winding of the control motor, not shown in Figure 5, is to be connected to a terminal 83 which, in turn, is connected to the brush 80, while the other end of this armature winding will be connected to a terminal 84 of the brush 81. When the periodic current interrupter shaft 77 and the disk 78 rotate, the terminals 83 and 84 of the periodic current interrupter are overbridged during the engagements of the metal segment 78 with the brushes 80 and 81, i. e., a series of short-circuiting pulses is produced in the armature winding of the control motor connectable to these terminals. The time intervals of these short-circuiting pulses can be readily adjusted by displacing the lever 82.

A periodic current interrupter for two control motors, operating according to the principle of the periodic current interrupter shown in Figure 5, is illustrated in section in Figure 6 and perspectively in Figure 7. The numbers of revolutions of these two control motors, not shown in these figures, are independently adjustable by means of two levers 82 and 85. The shaft 77 of the periodic current interrupter is rotated at constant speed by a source of power in the same way as the periodic current interrupter in the previous embodiments. A graduation 86 secured to the transmitter housing adjacent the brush lever 82 facilitates the adjustment of the numbers of revolutions of the control motor.

Although several embodiments of the present invention have been herein illustrated and described, it will be evident to those skilled in the art that various modifications may be made in the details of this new system without departing from the principles herein set forth and the scope of the appended claims.

I claim:

1. An electromagnetic control-drive mechanism comprising in combination a control motor of the induction type having a stator with a stator winding and a rotor with a rotor winding, a source of A. C. current connected to said stator winding to produce in said stator a field rotating at a constant speed, means for periodically short-circuiting said rotor winding at regular short intervals comprising a periodic circuit interrupter inserted in the circuit of said rotor winding, means independent of said motor for driving said interrupter and means on said interrupter for varying the length of said intervals.

2. An electromagnetic control drive mechanism according to claim 1, wherein said stator has a three-phase alternating current winding and wherein said source of a current is a three-phase alternating current source.

3. An electromagnetic control drive mechanism according to claim 1, said interrupter comprising a cylinder having an insulating cylinder surface, a plurality of wedge-shaped conductive segments substantially equally distributed on said surface and disposed with their apices at one front side of said cylinder and their broad ends at the opposite side of said cylinder, power means to rotate said cylinder at a substantially constant speed, a relatively stationary brush riding on said cylinder surface, an annular conductive member associated with said cylinder and electrically connected to said conductive segments, a stationary brush riding on said annular member, said latter stationary brush and said former relatively stationary brush being inserted in said circuit, and means to displace said relatively stationary brush on and along said cylinder surface to vary the length of said intervals of said interrupter.

4. An electromagnetic control drive mechanism comprising in combination a control motor of the induction type having two stators disposed side by side and being mechanically connected to one another, separate stator windings in said stators, at least one source of A. C. current connected to said stator windings in such a manner that fields acting in opposite directions are produced in said stators, a rotor in each of said stators, a common shaft on which said rotors are mounted, rotor windings in each of said rotors, a periodic current interrupter, circuits including the latter and said rotor windings, switching means in said circuits to selectively connect either one of said rotor windings to said interrupter while interrupting the other of said rotor windings, said interrupter being adapted to periodically short-circuit said rotor windings at regular short intervals, means on said interrupter to vary the length of said intervals, whereby the selected of said rotors is acted upon by the respective field of said stators in one or the other of said rotating directions in accordance with the length and frequency of the current pulses flowing in the connected of said rotor windings controlled by said interrupter.

5. An electromagnetic control drive mechanism according to claim 4, said rotors being provided with slip rings to which the ends of said rotor windings are connected, stationary brushes riding on said slip rings, said slip rings and brushes forming parts of said circuits.

6. An electromagnetic control drive mechanism according to claim 4, wherein said switching means is an electric relay having in said circuits operating contacts, via which either of said rotor windings is connectable to said interrupter.

7. An electromagnetic control drive mechanism according to claim 4, wherein said interrupter is connectable across either of said rotor windings via said circuits to control said rotor windings by short-circuiting pulses.

8. An electromagnetic control drive mechanism according to claim 7, said interrupter having two parts, of which one is connectable across the one of said rotor windings and the second across the other of said rotor windings via said circuits, said interrupter parts being adapted to produce short-circuiting pulse of different length in the respective rotor windings.

9. An electromagnetic control drive mechanism according to claim 4, wherein one three-phase alternating current source is connected to said windings of said stators which are designed as three-phase alternating current stators.

10. An electromagnetic control drive mechanism according to claim 4, wherein a three-phase alternating current source and a direct current source are provided, one of said stators being constructed as three-phase alternating current stator having its winding connected to said three-phase alternating current source, the other of said stators being constructed as direct current stator having its winding connected to said direct current source, so that when said winding of said rotor associated with said three-phase current stator is connected via said switching means to said interrupter said rotors on said common shaft will rotate in one direction under control of said interrupter, while when said winding of said other rotor is connected via said switching means to said interrupter, said rotors on said common shaft will be slowed down under control of said periodic current interrupter and brought to a complete stop.

11. An electromagnetic control drive mechanism according to claim 4, said interrupter comprising a cylinder having an insulating cylinder surface, a plurality of wedge-shaped conductive segments substantially equally distributed on and over said surface and disposed with their apices at one front side of said cylinder and their broad ends at the opposite side of said cylinder, power means to rotate said cylinder at a substantially constant speed, a pair of relatively stationary brushes riding on said cylinder surface, an annular conductive member associated with said cylinder and electrically connected to said conductive segments, a stationary third brush riding on said annular member, said latter stationary brush being connected to one of the ends of each of said rotor windings, said pair of relatively stationary brushes being respectively connected to the other of the ends of each of said rotor windings and being angularly displaced with respect to one another in such a manner that only one of said pair of brushes will engage one of said conductive segments at one instant, while the other of said pair of brushes will contact the insulating portion of said cylinder between two of said segments, so that said rotor windings will be alternately connected to said conductive segments thereby alternately producing opposing actions in the respective rotors.

References Cited in the file of this patent

UNITED STATES PATENTS

| | | |
|---|---|---|
| 129,085 | Barjon | July 16, 1872 |
| 1,362,844 | Cardoza | Dec. 21, 1920 |
| 2,748,333 | Lee | May 29, 1956 |